(12) United States Patent
Palermo

(10) Patent No.: US 9,061,227 B2
(45) Date of Patent: Jun. 23, 2015

(54) PURIFICATION ASSEMBLIES AND METHODS OF ASSEMBLING PURIFICATION ASSEMBLIES

(75) Inventor: Brian Palermo, Dryden, NY (US)

(73) Assignee: Pall Corporation, Port Washington, NY (US)

( * ) Notice: Subject to any disclaimer, the term of this patent is extended or adjusted under 35 U.S.C. 154(b) by 117 days.

(21) Appl. No.: 12/376,825

(22) PCT Filed: Aug. 17, 2007

(86) PCT No.: PCT/US2007/076208
§ 371 (c)(1),
(2), (4) Date: Feb. 18, 2009

(87) PCT Pub. No.: WO2008/024682
PCT Pub. Date: Feb. 28, 2008

(65) Prior Publication Data
US 2010/0162671 A1    Jul. 1, 2010

Related U.S. Application Data

(60) Provisional application No. 60/840,024, filed on Aug. 25, 2006.

(51) Int. Cl.
*B01D 53/02* (2006.01)
*B01D 46/00* (2006.01)
*B01D 53/04* (2006.01)

(52) U.S. Cl.
CPC ....... *B01D 46/0005* (2013.01); *Y10T 29/49826* (2015.01); *Y10T 29/49945* (2015.01); *B01D 53/0415* (2013.01); *B01D 2258/0216* (2013.01); *B01D 2259/40084* (2013.01); *B01D 2259/455* (2013.01)

(58) Field of Classification Search
CPC ................................. B01D 46/00; F16K 27/00
USPC ........ 55/385.1, 490, 495, 502, 503, 505, 510; 95/273
See application file for complete search history.

(56) References Cited

U.S. PATENT DOCUMENTS

| | | | | |
|---|---|---|---|---|
| 4,259,099 A | * | 3/1981 | Akabane et al. | 55/482 |
| 4,382,808 A | * | 5/1983 | Van Wormer et al. | 55/418 |
| 5,234,165 A | * | 8/1993 | Rhyne, Jr. | 239/127 |
| 5,362,223 A | | 11/1994 | Gneuss | |
| 5,545,242 A | * | 8/1996 | Whitlock et al. | 55/502 |
| 5,605,179 A | | 2/1997 | Strong, Jr. et al. | |
| 5,663,476 A | | 9/1997 | Cripe et al. | |
| 5,819,782 A | | 10/1998 | Itafuji | |
| 6,015,444 A | * | 1/2000 | Craft et al. | 55/320 |

(Continued)

FOREIGN PATENT DOCUMENTS

| | | |
|---|---|---|
| FR | 1 546 259 | 11/1968 |
| FR | 2 572 305 A1 | 5/1986 |

(Continued)

*Primary Examiner* — Duane Smith
*Assistant Examiner* — Minh-Chau Pham
(74) *Attorney, Agent, or Firm* — Leydig, Voit & Mayer

(57) ABSTRACT

A purification assembly (10) may comprise a block member (12) and a purification unit (11) attached to the block member. A method of assembling a purification assembly may comprise attaching a purification unit to a block member. A purification unit may include fitting a fluid flow path (14) extending through the fitting, and a purification element (15) in the fluid flow path.

13 Claims, 7 Drawing Sheets

(56) References Cited

U.S. PATENT DOCUMENTS

| | | |
|---|---|---|
| 6,123,340 A | 9/2000 | Sprafka et al. |
| 6,149,718 A | 11/2000 | Cowan et al. |
| 6,273,139 B1 | 8/2001 | Ohmi et al. |
| 6,283,143 B1 | 9/2001 | Adachi, Jr. et al. |
| 6,302,141 B1 | 10/2001 | Markulec et al. |
| 6,447,565 B1 * | 9/2002 | Raszkowski et al. ......... 55/385.4 |
| 6,514,323 B1 * | 2/2003 | Palermo et al. .................. 95/273 |
| 6,546,961 B2 | 4/2003 | Fukushima |
| 6,615,870 B2 | 9/2003 | Tsourides |
| 6,659,131 B2 | 12/2003 | Tsourides |
| 6,769,463 B2 | 8/2004 | Vu |
| 6,886,599 B2 | 5/2005 | Ichikawa et al. |
| 7,017,609 B2 | 3/2006 | Miwa |
| 7,410,519 B1 * | 8/2008 | Ewald .......................... 55/385.1 |

FOREIGN PATENT DOCUMENTS

| | | |
|---|---|---|
| JP | 48-109246 U | 3/1972 |
| JP | 58-73313 U | 5/1983 |
| JP | 10-85533 A | 4/1998 |
| JP | 11-165012 A | 6/1999 |
| WO | WO 2004/041415 A1 | 5/2004 |

* cited by examiner

PURIFICATION ASSEMBLIES AND METHODS OF ASSEMBLING PURIFICATION ASSEMBLIES

FIELD OF THE INVENTION

This invention relates to purification assemblies and methods of assembling purification assemblies. More particularly, it relates to purification assemblies used to purify fluids, e.g., gases, including gases used in industrial processes such as the manufacture of semiconductors. Gases used in industrial processes may be purified to remove particulate matter, such as solids, colloids, gels, and liquid particles, and chemical substances, such as homogenous or molecular contaminants. In the manufacture of semiconductors, for example, gases may be purified to remove particulate matter because particulate matter in the gases can introduce flaws into the semiconductors being manufactured.

SUMMARY OF THE INVENTION

The present invention provides highly effective and reliable purification assemblies and methods of assembling purification assemblies.

In accordance with one aspect of the invention, purification assemblies may comprise a purification unit and a block member. The purification unit may include a first surface, an opposite second surface, and a cavity. The purification unit may further include a fluid flow path and a purification element. The fluid flow path extends from the first surface through the cavity to the second surface, and the purification element is positioned in the cavity across the fluid flow path. The block member may include a first surface, a second surface, and a socket. The socket extends through the block member from the first surface to the second surface of the block member. The purification unit is positioned in the socket, and the block member surrounds the purification unit. The first surface of the block member surrounds one end of the socket and is coplanar with the first surface of the purification unit. The second surface of the block member surrounds the opposite end of the socket and is coplanar with the second surface of the purification unit.

In accordance with another aspect of the invention, a purification assembly may comprise a block member and a purification unit. The block member may include a first surface, an opposite second surface, and a socket. The socket extends from the first surface to the second surface of the block member and has an engagement region. The purification unit may include a first surface, a second surface, a cavity, a fluid flow path, and a purification element. The fluid flow path extends from the first surface through the cavity to the second surface. The purification element is positioned in the cavity across the fluid flow path. The purification unit may further include an engagement region. At least one of the engagement regions of the purification unit and the block member comprises first and second axially spaced engagement surfaces and a depression between the first and second engagement surfaces. The purification unit is positioned in the socket of the block member with the engagement regions of the purification unit and the block member tightly contacting one another.

Purification assemblies embodying the present invention have many advantages, including, for example, their small and compact sizes, which allow for more versatile use, while also maintaining mechanical integrity, effectiveness, and reliability.

In accordance with another aspect of the invention, methods of assembling a purification assembly may comprise In accordance with another aspect of the invention, methods of assembling a purification assembly may comprise inserting a purification unit into a socket of a block member, including contacting an engagement region of the socket and an engagement region of the purification unit. At least one of the engagement regions of the purification unit and the block member may comprise first and second axially spaced engagement surfaces and a depression between the first and second engagement surfaces. Contacting the engagement regions may comprise tightly contacting the engagement region of one of the purification unit and the block member and the first and second engagement surfaces of the other of the purification unit and the block member.

The methods of assembling a purification assembly embodying the present invention have many advantages. For example, that the purification units can be assembled individually first, leak tested, and then be installed in block members, allowing for simpler assembly of the purification unit to the block member. Additionally, these assembly methods may result in purification assemblies that are small and compact, thereby allowing for more versatile use of the purification assemblies, while maintaining their mechanical integrity, effectiveness, and reliability.

DESCRIPTION OF PREFERRED EMBODIMENTS

Figure 1:
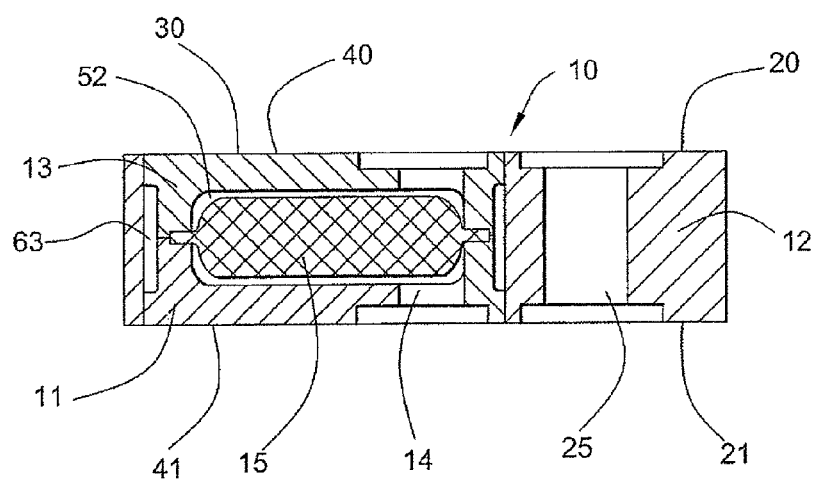
FIG. 1 is a cross-sectional view of an embodiment of a purification assembly.
Figure 2:
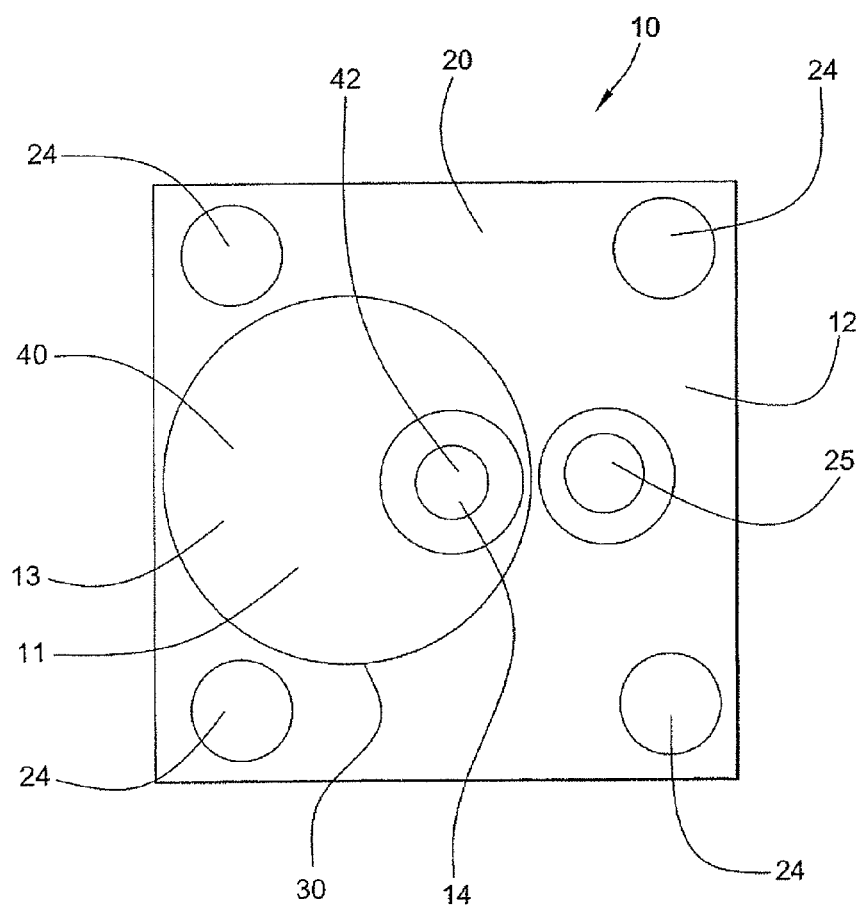
FIG. 2 is a top view of the embodiment shown in FIG. 1.

Purification assemblies may be embodied in a wide variety of ways, including, for example, as a block purifier. As shown in FIG. 1 and FIG. 2, one example of a purification assembly 10 may include a purification unit 11 disposed in a block member 12. The purification unit 11 may include a fitting 13, at least one fluid flow path 14 through the fitting 13, and a permeable purification element 15 positioned in the fluid flow path 14. The purification assembly may be positioned in any fluid system, for example, between a fluid handling device and a substrate in a fluid system for manufacturing semiconductors. The purification assemblies and purification units of the present invention have many advantages, including, for example, their small and compact sizes, which allow for more versatile use, while also maintaining mechanical integrity, effectiveness, and reliability.

The block member of the purification assembly may have any suitable configuration, including an irregular configuration or a regular configuration, such as a cylindrical, disk-shaped or rectangular parallelepiped configuration. The block member may comprise a single unitary or integral block member 12 as shown in FIG. 1 and FIG. 2, or it may comprise a plurality of pieces attachable to one another to form the block member.

Figure 3:
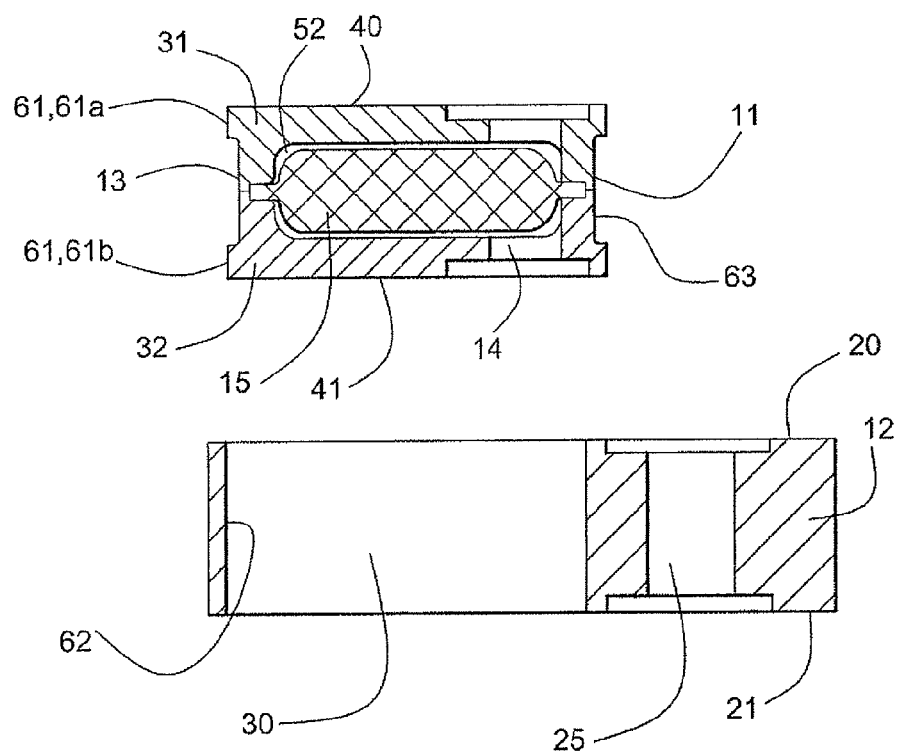
FIG. 3 is an exploded, cross-sectional view of a purification assembly.
Figure 6:
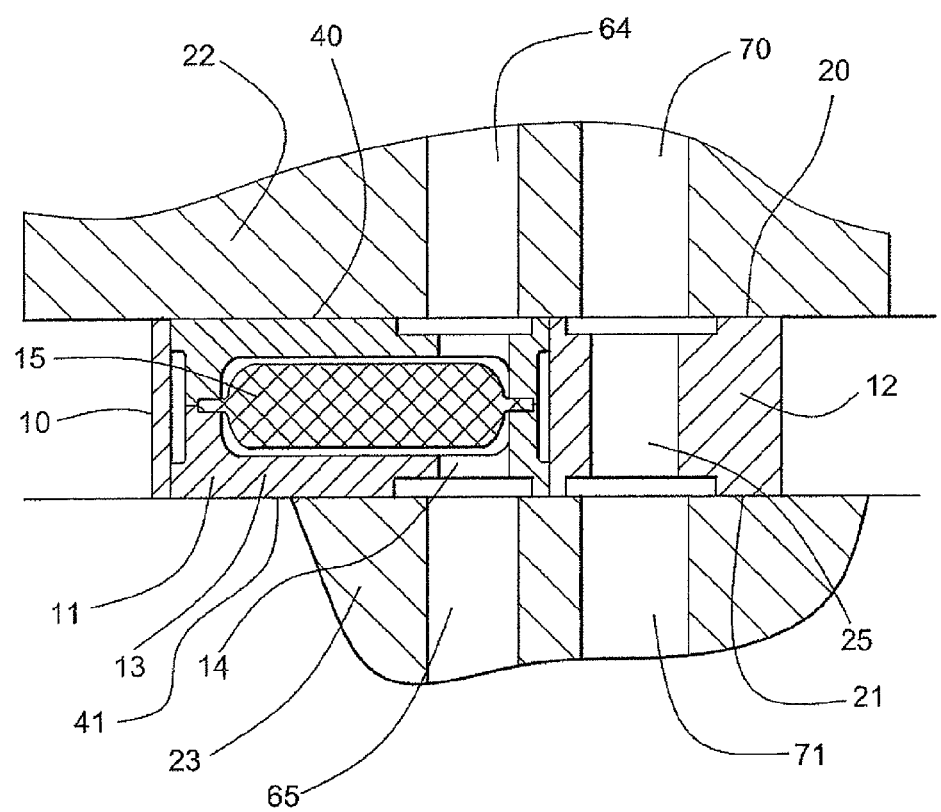
FIG. 6 is a cross-sectional view of a purification assembly in fluid communication with a fluid handling device and a substrate.

The block member 12 may include mounting surfaces 20, 21, which may be opposite one another on its exterior. The mounting surfaces 20, 21 may also be parallel to one another, as shown in FIG. 1 and FIG. 3. The mounting surfaces may contact other fluid components. For example, as shown in FIG. 6, one mounting surface 20 of the block member 12 may contact a fluid handling device 22 while the other mounting surface 21 of the block member 12 may contact a substrate 23. Fluid assemblies, including purification assemblies such as block purifiers, fluid handling devices, and substrates, are disclosed in U.S. Pat. No. 6,514,323 B1 and U.S. Provisional Patent Application No. 60/840,025 entitled "Fluid Assemblies" which was filed on Aug. 25, 2006, and listed Brian Palermo as the inventor. Both U.S. Pat. No. 6,514,323 B2 and U.S. Provisional Patent Application No. 60/840,025 are incorporated by reference herein to further support all of these features. The mounting 20, 21 surfaces of the block member 12 may further include bolt holes 24, as shown in FIG. 2, so that the block member 12 may be bolted to a fluid component. Alternatively, the block member may be attached to a fluid component in any suitable way, including, permanently or removably, for example, by welding or an interference fit.

The block member may also include one or more fluid flow paths extending through the block member. For example, the block member 12 shown in FIGS. 1-3 includes only one fluid flow path 25. The fluid flow path 25 may extend between the mounting surfaces 20, 21 of the block member 12 and may be used to provide fluid communication between the fluid components attached to the block member 12. Alternatively, the block member 12 may not include any fluid flow paths, as shown, for example, in FIG. 7.

The block member 12 may further include a socket 30, which may be an opening that opens to a side, to the top, to the bottom, and/or to the top and bottom of the block member, as shown for example, in FIG. 3. The socket 30 is arranged to receive the purification unit 11, and the purification unit 11 may be disposed in the socket 30. The socket may have any of numerous configurations and may be configured similarly to the purification unit. For example, when a cylindrical purification unit 11 is used, as shown in FIGS. 1-3, the socket 30 may include a cylindrical opening and may, for example, extend through the block member 12, exposing the purification unit 11 at the top and bottom of the block member 12. Further, the socket may be spaced and isolated from any fluid flow path in the block member.

The purification unit 11 may be attached to the block member 12 in any of numerous ways. For example, it may be permanently attached, e.g., by welding. Alternatively, it may be removably attached, e.g. by a snap, press, friction, or interference fit, to the block member, allowing for easy removal and replacement of the purification unit. The purification unit may also be bolted or threaded to the block member. In the embodiment shown in FIG. 3, the purification unit 11 may be fitted in the socket 30 of the block member 12 by a friction or interference fit.

The purification unit may have any suitable configuration, including an irregular configuration or a regular configuration, such as a cylindrical, disk-shaped, or rectangular parallelepiped configuration. The purification unit may include a fitting. The fitting may be a single-piece unitary or integral fitting. Alternatively, as shown, for example, in FIG. 4, the purification unit may include a fitting 13 comprising multiple pieces 31, 32 attachable to one another. The fitting, as well as the block member, may be formed from various materials, including a metallic material, such as stainless steel, and/or a polymeric material. Although different parts of the fitting and the block member may be formed from different materials, for many embodiments the parts, including the pieces of the fitting, may be formed from the same material, preferably from a metal such as stainless steel.

Figure 4:
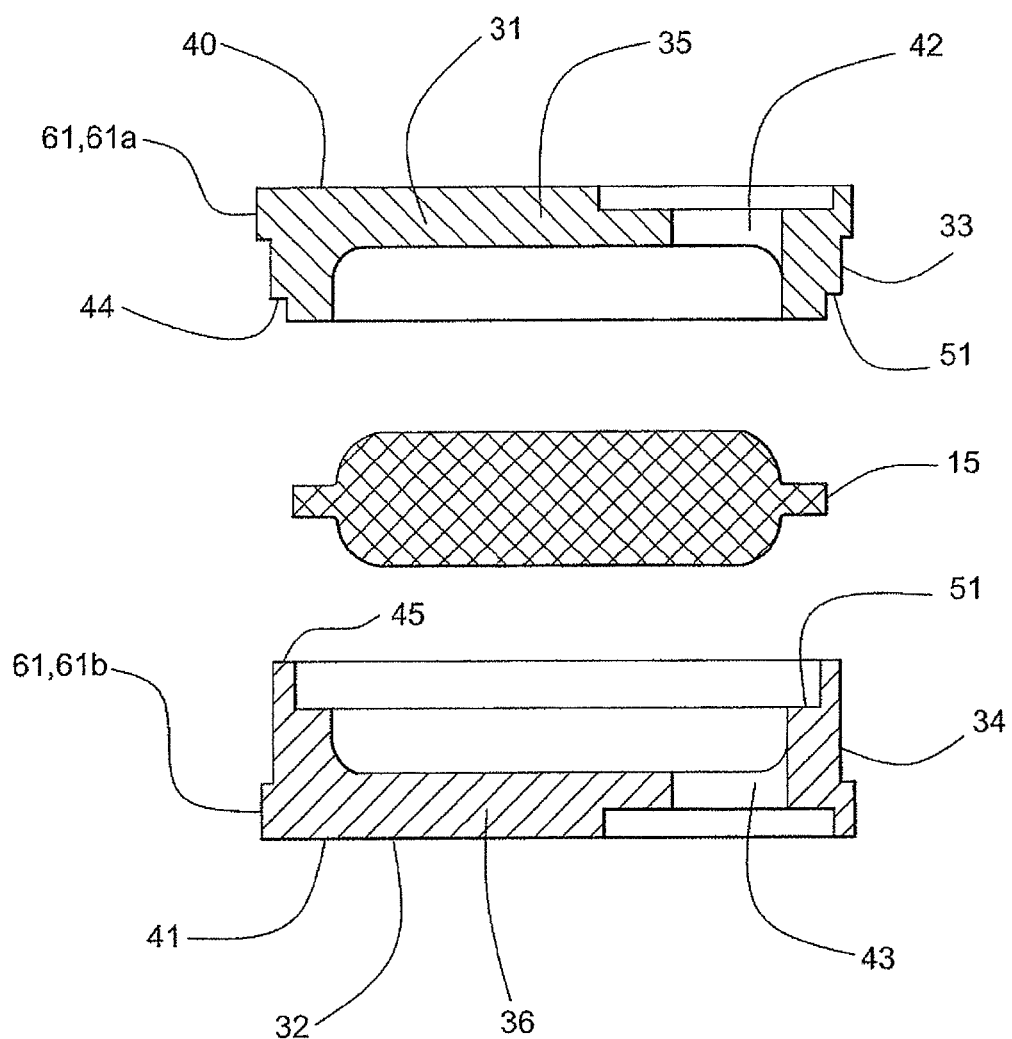
FIG. 4 is an exploded, cross-sectional view of a purification unit.

The pieces of the fitting may be permanently attached to one another, e.g. by welding or bonding, or may be removably attached, e.g., by bolting or threading. The pieces may be configured so that they are attached directly to one another. Alternatively, the pieces may be attached indirectly, for example, by having each piece attached to the purification element. The configurations and dimensions of the pieces may vary widely from one embodiment to another. Although the pieces 31, 32 generally may have similar configurations, as shown in FIG. 4, they may have very different configurations, for example, different shapes and/or different dimensions, such as different thicknesses. For example, one of the pieces may comprise substantially the entire fitting, while another piece may be a small plug which fits into the larger piece.

As shown in the embodiment illustrated in FIG. 3 and FIG. 4, the fitting 13 may include first and second pieces 31, 32. For example, the fitting 13 may comprise only the first and second pieces 31, 32 joined to one another. Each piece 31, 32 may comprise a generally cylindrical side wall 33, 34 which surrounds an open space. One end of each side wall 33, 34 may be generally closed by an end wall 35, 36 which overlays the side wall 33, 34. The surface 40, 41 of each end wall 35, 36 which is opposite the side wall 33, 34 may be flat, and an opening 42, 43 may extend through each end wall 35, 36 from the flat surface 40, 41 of the end wall 35, 36 to the space within the side wall 33, 34. The other end of each side wall 33, 34 may open onto the space within the side wall 33, 34. The two pieces 30, 31 may coaxially fit together at the open ends of the side walls 33, 34 to form the fitting 13.

Figure 5:
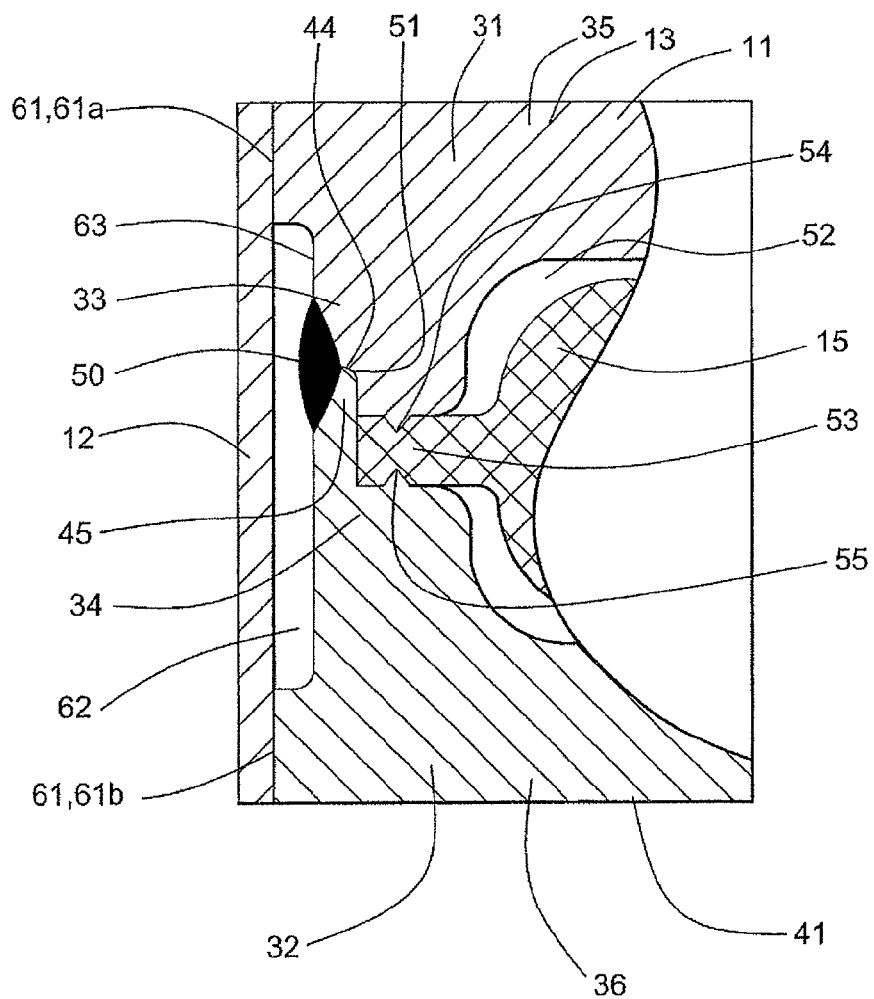
FIG. 5 is a cross-sectional view of an embodiment of a purification assembly.

In some embodiments, including that shown in FIG. 4 and FIG. 5, the pieces 31, 32 may have alignment features 44, 45. The alignment features may align the pieces when they are fitted to one another and may be configured in a variety of ways. For example, as shown in FIG. 5, the alignment features 44, 45 may include mating stepped ledges at the open ends of the side walls 33, 34 of the two pieces 31, 32. The alignment features may be such that the pieces of the fitting may be joined to one another away from the purification element. For example, as shown, in FIG. 5, the pieces 31, 32 may be joined at the alignment features 44, 45 by a weld 50 that does not contact the purification element 15, e.g., by a weld that is radially spaced and/or axially offset from the purification element 15. The purification element 15 may then be held in place, e.g., clamped, between the two welded pieces 31, 32 of the fitting 13. Some embodiments may include a stop 51 that prevents the purification element 15 from being overly compressed by the pieces 31, 32 of the fitting 13. The stop 51 may be part of the alignment features 44, 45, for example, as shown in FIG. 5, where the alignment features 44, 45 provide abutting ledges between the two pieces 31, 32. Alternatively, the stop may be a feature that is separate from the alignment features. Other embodiments may include a stop but no alignment features or may weld the purification element along with the pieces of the fitting.

Figure 7:
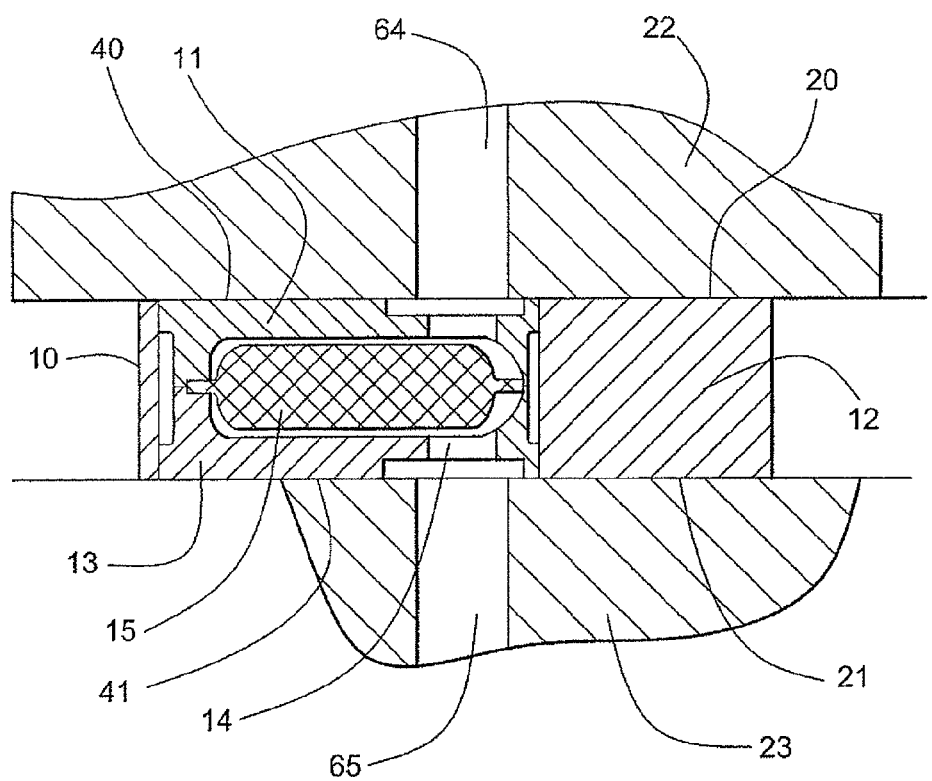
FIG. 7 is a cross-sectional view of a purification assembly.

The purification unit 11 includes at least one fluid flow path 14. The fluid flow path 14 may extend through the purification unit 11 such that fluid flowing along the fluid flow path 14 passes through the purification element 15. The fitting 13 may have first and second opposite surfaces including, for example, the opposed flat surfaces 40, 41 of the pieces 31, 32 of the fitting 13. The fluid flow path 14 may extend between and open onto these surfaces 40, 41. Further, at least one or both of the flat surfaces 40, 41 of the purification unit 11 may comprise mounting surfaces and may be coplanar with the mounting surfaces 20, 21 of the block member 12, together forming the mounting surfaces of the purification assembly 10. This configuration allows the purification assembly 10 and the purification unit 11 to be sandwiched between, and fluidly communicate between, two fluid components, for example, a fluid handling device 22 and a substrate 23 as shown in FIGS. 6 and 7. The fluid flow path 14 may have any suitable configuration, including, for example, a straight-line configuration. Alternatively, the fluid flow path may have an L-shaped or V-shaped configuration. In some embodiments, the purification unit may have only one fluid flow path. In other embodiments, the purification unit may further include at least a second fluid flow path having any suitable configuration. The second fluid flow path may also pass through the fitting and may, or may not, be isolated from the first fluid flow path.

The purification unit 11 may further include a cavity 52 in the fitting 13 and the purification element 15 may be disposed in the cavity 52 encased or surrounded by the fitting 13. The cavity 52 may have any of various irregular or regular configurations, including a cylindrical, disk-shaped, elliptical, or rectangular parallel piped configuration. For many embodiments, the cavity may have a configuration similar to the configuration of the purification element.

Where the fitting 13 comprises multiple pieces 31, 32, the pieces 31, 32 may together define the cavity 52. For example, in the purification unit 11 of FIG. 4, the cavity 52 may be defined by the open spaces within the side walls 33, 34 and between the end walls 35, 36 of the attached pieces 31, 32. Alternatively, the cavity may be disposed substantially or entirely in only one of the pieces.

The purification element 15 may be disposed in the cavity 52 in a fluid flow path 14 that extends through the purification unit 11 so that a substantial amount, or more preferably all, of the fluid flowing along the fluid flow path 14 passes through the purification element 15. The cavity 52 may be in fluid communication with the fluid flow path 14 and may be disposed at any location along the fluid flow path 14. For example, for some embodiments the fluid flow path 14 may comprise the cavity 52 and the openings 42, 43 in the end walls 35, 36, e.g., where the openings 42, 43 fluidly communicate with the cavity 52 and are smaller, e.g., have a smaller diameter, than the cavity 52. In addition, the cavity 52 may have a peripheral groove 53 into which an edge portion of the purification element 15 can fit. The purification element 15 may be clamped sealingly in place within the groove, e.g., in conjunction with the stop 51, when the pieces 31, 32 of the fitting 13 are attached. This allows the purification element 15 to be compressed sufficiently to seal against the pieces 31, 32 without pinching off or damaging, for example, tearing, the purification element 15.

The purification element 15 may have any of a variety of configurations. For example, the purification element 15 may comprise a porous body which has a generally disk-shaped, cylindrical, conical, or dome-shaped configuration. The surface of the purification element may be substantially flat on a macroscopic scale, but it is possible for it to be formed with ridges or corrugations to increase the surface area. The purification element may also have a more irregular configuration, such as a mass of fibers or a bed of particles.

The material and pore structure of the permeable purification element can be chosen in accordance with various factors, including, for example, the materials which are to be removed, the maximum operating temperature, and the desired flow characteristics through the purification element. The purification element may be fashioned from a corrosion resistant metallic material, such as stainless steel, nickel, or a Hastelloy metal. Alternatively, it may be fashioned from a polymeric material, such as a polymeric membrane or fibrous material, or from a glass fiber material or a ceramic material. Certain types of purification elements are also described in detail in U.S. Pat. Nos. 5,490,868 and 5,545,242, which are incorporated herein by reference in their entirety to support this and other features of the present invention. The purification element may also comprise a media, e.g., a reactive media, for removing homogenous or molecular contaminants, including undesirable chemical substances, such as undesirable gaseous components, from the fluid. One example of a reactive media is disclosed in International Publication No. WO/0168241 to Brown et al., which is incorporated herein by reference in its entirety to support this and other features of the present invention.

The purification assembly may be made by forming the purification unit and disposing the purification unit in a block member. To form the purification unit, the purification element may be permanently or removably attached to the fitting in a variety of ways, including, for example, welding, brazing, bonding, crimping, clamping, or packing. When the fitting and the purification element are formed from a metal, they may be welded to one another. For example, laser welding, TIG (GTAW) welding, or electron beam welding may be used to join the fitting and the purification element. When the fitting and the purification element are formed from a polymeric material, they may be joined by bonding, e.g., solvent bonding, adhesive bonding, or thermal bonding. Where the fitting includes multiple pieces, the purification element may be permanently or removably attached to only one or more than one of the pieces.

For example, for some embodiments the purification element 15 may be positioned between the open ends of the two pieces 31, 32 of the fitting 13, and the two pieces 31, 32 may be coaxially pressed into contact with one another and/or the purification element 15, sandwiching the purification element 15 between them as shown, for example, in FIGS. 4 and 5. The alignment features 44, 45 may engage and slide along one another, and the edge portion of the purification element 15 may be sealing compressed in the groove 53 and/or clamped between the two pieces 31, 32. The stops 51 may abut one another, preventing overcompression of the purification element 15. Further, the pieces 31, 32 may include sealing ridges 54, 55 which protrude into the edge portion of the purification element 15 and enhance the seal between the purification element 15 and the fitting 13.

Where the fitting comprises multiple pieces, the pieces may be attached to form the fitting at the same time or after the purification element is mounted to one or more pieces of the fitting. Further, the pieces may be sealed to one another to prevent fluid leakage from the purification unit. The pieces may be removably attached, for example, by connectors such as screws or bolts, by threading them to one another, or by a snap fit or an interference fit. Alternatively, the pieces may be permanently attached, for example, by crimping, bonding, brazing, or welding. For example, after the purification element 15 has been positioned between the two pieces 31, 32 of the fitting 13, the pieces 31, 32 may be attached by welding them to one another. For some embodiments, the weld 50 may extend peripherally around the perimeter, e.g., the circumference, of the purification unit 11 and may seal the interior of the purification unit 11 from the exterior. The weld 50 may be made at a location laterally, e.g., radially, spaced and/or longitudinally, e.g., axially, offset from the edge portion of the purification element 15. The purification element 15 may then be protected from the heat of the welding process. Alternatively, for some embodiments the pieces may be welded directly next to or along with the purification element. After the pieces are sealed to one another, the purification unit may be tested to ensure there are no leaks and then mounted to a block member. Mounting a sealed, fluid tight purification unit to a block member greatly simplifies the fabrication while providing an effective, reliable purification assembly.

The purification unit may be mounted to the block member in a variety of ways. The purification unit may be permanently mounted to the block member, for example, by crimping, brazing, welding, or bonding, or removably mounted to the block member, for example, by connectors such as bolts, by a threaded fit, by a snap fit, or by an interference fit such as a press fit or a friction fit. Further, the purification unit may be fitted within, e.g., encased or surrounded by, the block member or may be fitted next to, e.g., on the side, top, and/or bottom, of the block member.

For some embodiments, the purification unit 11 may be mounted in a socket 30 of the block member 12. In the illustrated embodiment, the purification unit 11, e.g., the fitting 13, and the block member 12 may include cooperating engagement surfaces 61, 62. The engagement surfaces 61, 62 may be arranged to contact one another and provide a tight friction or interference fit between the purification unit 11 and the block member 12. The purification unit 11 may then be mounted to the block member 12 by simply inserting the purification unit 11, e.g., the fitting 13, into the socket 30, without welding the purification unit 11 to the block member 12. The engagement surfaces 61, 62 slide axially along one another until the purification unit 11 is fully fitted in the socket 30 with the engagement surfaces 61, 62 tightly contacting one another. Further, where the pieces 31, 32 of the fitting 13 are sealed to one another, e.g., by the weld 50, the purification unit 11 can be mounted to the block member 12 without sealing the purification unit 11 to the block member 12, e.g., without additional welds or seals.

One or both of the engagement surfaces 61, 62 may be configured to provide a high energy, high pressure interference fit between them. For example, as shown in FIG. 3 and FIG. 5, the fitting 13 may include a groove 63 which extends peripherally around the perimeter or side of the fitting 13 on the exterior. The groove 63 may divide the engagement surface 61 on the fitting 13 of the purification unit 11 into two axially spaced, peripherally extending engagement surfaces 61a, 61b respectively located at the top and bottom of the fitting 13 with the groove 63 between them. The groove 63 reduces the aggregate area of the engagement surface 61 to the combined area of the spaced surfaces 61a, 61b. For example, the aggregate axial length, and the corresponding surface area, of the engagement surfaces 61a, 61b of the purification unit 11 may amount to less than about 25% or less than about 35% or less than about 50% of the total axial length, e.g., thickness, of the fitting 13. Decreasing the surface area of one or both of the engagement surfaces 61, 62 may increase the pressure at the interface or points of contact between the purification unit 11 and the block member 12, thereby providing for higher energy contact and a better interference fit of the purification unit 11 in the socket 30 of the block member 12. Further, by positioning the weld 50 between the two pieces 31, 32 of the fitting 13 in the groove 63, the weld 50 may not be part of the engagement surface 61 of the purification unit 11, allowing for less rigorous machining and polishing of the weld 50.

The purification assembly 10 may be mounted to a fluid handling device 22, a substrate 23, or other fluid component or piece of equipment in any of numerous ways, including, for example, by bolting through bolt holes 24 in the purification assembly 10, as shown in FIG. 2, by welding, or by a snap fit or an interference fit. At least one fluid flow path 14 of the purification assembly 10 may provide fluid communication between a port 64, for example, an inlet port or an outlet port, of a fluid handling device 22 and a fluid conduit 65 of a substrate 23, as shown, for example, in FIG. 6. There may be additional fluid flow paths flowing through the purification unit and/or the block member. These additional flow paths may, for example, provide fluid communication between a different port of the same fluid handling device and a different fluid conduit of the substrate, between a different port of the same fluid handling device and a port of a different fluid handling device, or between a port of a different fluid handling device and a different fluid conduit of the substrate. For example, as shown in FIG. 6, a fluid flow path 14 passing through the purification unit 11 of the purification assembly 10 may provide for fluid communication between a fluid conduit 65 of a substrate 23 and an inlet port 64 of a fluid handling device 22. A second fluid flow path 25, passing through the block member 12, but not the purification unit 11, may provide fluid communication between a second port, e.g., an outlet port 70, of the fluid handling device 22 and another fluid conduit 71 of the substrate 23. Alternatively, there may be only a single fluid flow path 14 through the purification assembly 10, e.g., through the purification unit 11, as shown in FIG. 7, and the purification assembly 10 may be mounted between and provide fluid communication between other fluid components 22, 23. Seals, including face seals, such as gaskets, O-rings, C-ring seals, W-seals, or Z-seals, may be provided around the fluid flow paths at the interfaces between the fluid flow paths and the adjacent fluid components.

Methods for purifying a fluid, such as a gas, may include directing the fluid along a fluid flow path through a purification unit of a purification assembly. For example, as shown in FIG. 6 and FIG. 7, a gas may be directed along a fluid conduit 65 of a substrate 23 and into the fluid flow path 14 of the purification assembly 10 which includes the purification element 15. The gas may pass through one opening in the fitting 13 along the fluid flow path 14 into the cavity 52. In the cavity 52, the gas passes through the purification element 15 from the upstream side to the downstream side, where it is purified, e.g., filtered to remove particulates. Because the purification element is sealed to the fitting, for example, by sealingly compressing the edge portion of the purification element 15 in the groove 53 between the pieces 31, 32 of the fitting 13 and/or by embedding the sealing ridges 54, 55 in the edge portion of the purification unit 11, substantially all or all of the gas passes through the purification element 15 and little or none of the gas bypasses the purification element 15. Further, because the pieces 31, 32 of the fitting 13 are sealed to one another, for example, by the weld 50, none of the gas leaks from the interior of the purification unit 11, e.g., from the cavity 52, to the exterior of the purification unit 11. From the downstream side of the purification element 15, the purified gas passes from the cavity 52 along the fluid flow path 14 to the opposite opening in the fitting 13 and hence into the inlet port 64 of the fluid handling device 64.

For purification assemblies having a second fluid flow path, fluid may be passed through purification assembly without passing through a purification element. For example, as shown in FIG. 6, a gas may pass from an outlet port 70 of the fluid handling device 22 into the fluid flow path 25 in the block member 12. The gas may then pass along the fluid flow path 25 in the block member 12, which does not include a purification element, and then into a second fluid conduit 71 of the substrate 23.

While various aspects of the invention have been illustrated and described with reference to several embodiments, variations of these embodiments as well as completely different embodiments may be encompassed by the invention. For example, one or more of the features of any of the disclosed embodiments may be substituted and/or combined with one or more features of any other embodiment. Additionally, an embodiment may include fewer than all of the features of each disclosed embodiment. Accordingly, the invention includes all modifications encompassed within the spirit and scope of the invention as defined by the following claims.

The invention claimed is:

1. A purification assembly comprising:
a purification unit including a first mounting surface, an opposite second mounting surface, and a cavity, wherein the purification unit further includes a fluid flow path which extends from the first surface through the cavity to the second surface and a purification element which is positioned in the cavity across the fluid flow path; and
a block member including a first mounting surface and an opposite second mounting surface, wherein the block member further includes a socket which extends through the block member opening to the first mounting surface and to the second mounting surface of the block member, the purification unit being positioned in the socket and the block member surrounding the purification unit, wherein the first mounting surface of the block member at one end of the socket is coplanar with the first mounting surface of the purification unit and the second mounting surface of the block member at an opposite end of the socket is coplanar with the second mounting surface of the purification unit, such that the socket has an inner axial length from the one end to the opposite end that is equal to a distance between the first mounting surface of the purification unit and the second mounting surface of the purification unit.

2. The purification assembly of claim 1 wherein the block member further includes a fluid flow path which extends from the first mounting surface of the block member to the second mounting surface of the block member, the socket being spaced and isolated from the fluid flow path of the block member.

3. The purification assembly of claim 1 wherein the socket has a cylindrical configuration and the purification unit has a cylindrical configuration and wherein the purification unit has a side wall that fits against the block member in the socket.

4. The purification assembly of claim 1 wherein the purification unit is fitted to the block member in the socket by an interference fit or a friction fit.

5. The purification assembly of claim 1 wherein the purification unit includes an engagement region and the block member includes an engagement region in the socket, at least one of the engagement regions of the block member and the purification unit comprising first and second axially spaced engagement surfaces and a depression between the first and second engagement surfaces, and wherein the purification unit is positioned in the socket with the engagement regions of the purification unit and the block member tightly contacting one another.

6. A purification assembly comprising:
a block member including a first mounting surface, an opposite second mounting surface, and a socket which opens to the first mounting surface to the second mounting surface, the socket having an engagement region; and
a purification unit including a first mounting surface, a second mounting surface, a cavity, a fluid flow path which extends from the first mounting surface through the cavity to the second mounting surface, and a purification element which is positioned in the cavity across the fluid flow path, wherein the purification unit further includes an engagement region, at least one of the engagement regions of the purification unit and the block member comprising first and second axially spaced engagement surfaces and a depression between the first and second engagement surfaces, and wherein the purification unit is positioned in the socket with the engagement regions of the purification unit and the block member tightly contacting one another, such that the first mounting surface and second mounting surface of the purification unit are coplanar with the first mounting surface and the second mounting surface of the block member, and that the socket has an inner axial length from the one end to the opposite end that is equal to a distance between the first mounting surface of the purification unit and the second mounting surface of the purification unit.

7. The purification assembly of claim 6 wherein the purification unit includes first and second pieces welded to one another, the weld being positioned in the depression in the purification unit.

8. The purification assembly of claim 6 wherein the depression comprises a groove.

9. The purification assembly of claim 6 wherein the purification unit has a side wall and the depression extends peripherally around the side wall of the purification unit.

10. The purification assembly of claim 6 wherein the first and second engagement surfaces comprise peripherally extending surfaces located at the top and bottom of the purification unit.

11. A method of assembling a purification assembly comprising inserting a purification unit into a socket, which opens to a first mounting surface and a second mounting surface of a block member, including contacting an engagement region of the socket and an engagement region of the purification unit, at least one of the engagement regions of the purification unit and the block member comprising first and second axially spaced engagement surfaces and a depression between the first and second engagement surfaces, wherein contacting the engagement regions comprises contacting the engagement region of one of the purification unit and the block member and the first and second engagement surfaces of the other of the purification unit and the block member, and wherein a first mounting surface and a second mounting surface of the purification unit are coplanar with the first mounting surface and the second mounting surface of the block member, and that the socket has an inner axial length from one end of the socket to an opposite end of the socket that is equal to a distance between the first mounting surface of the purification unit and the second mounting surface of the purification unit.

12. The method of claim 11 wherein inserting the purification unit into the socket includes establishing an interference fit or a friction fit between the purification unit and the block member.

13. The method of claim 11 further comprising welding first and second pieces to form the purification unit, including locating the weld in the depression in the purification unit.

* * * * *